United States Patent
Gubler

(10) Patent No.: US 11,975,404 B2
(45) Date of Patent: May 7, 2024

(54) OPTICAL HEAD

(71) Applicant: ConsultEngineerIP AG, Buonas (CH)

(72) Inventor: Ulrich Gubler, Buonas (CH)

(73) Assignee: ConsultEngineerIP AG, Buonas (CH)

( * ) Notice: Subject to any disclaimer, the term of this patent is extended or adjusted under 35 U.S.C. 154(b) by 647 days.

(21) Appl. No.: 16/631,313

(22) PCT Filed: Jul. 17, 2018

(86) PCT No.: PCT/EP2018/069330
§ 371 (c)(1),
(2) Date: Apr. 10, 2020

(87) PCT Pub. No.: WO2019/016172
PCT Pub. Date: Jan. 24, 2019

(65) Prior Publication Data
US 2021/0268601 A1    Sep. 2, 2021

(30) Foreign Application Priority Data
Jul. 18, 2017  (DE) .......................... 102017116110.4

(51) Int. Cl.
*B23K 26/06* (2014.01)
*B23K 26/00* (2014.01)
(Continued)

(52) U.S. Cl.
CPC ...... *B23K 26/0648* (2013.01); *B23K 26/0096* (2013.01); *B23K 26/1476* (2013.01);
(Continued)

(58) Field of Classification Search
CPC .. B23K 26/24; B23K 1/0056; B23K 26/0648; B23K 26/21; B23K 26/0096; B23K 26/1476; B23K 2103/42; B23K 26/064; B23K 26/06; B29C 65/1638; B29C 66/81267

See application file for complete search history.

(56) References Cited

U.S. PATENT DOCUMENTS 4,827,098 A * 5/1989 Kasner ................. B23K 26/035
219/121.75
7,211,166 B2    5/2007 Chen et al.
(Continued)

FOREIGN PATENT DOCUMENTS

| CN | 101486255 A | * | 7/2009 | ......... B29C 65/1635 |
| CN | 101486255 A |   | 7/2009 | |

(Continued)

OTHER PUBLICATIONS

International Search Report PCT/EP2018/069330, dated Sep. 14, 2018.
(Continued)

*Primary Examiner* — John J Norton
*Assistant Examiner* — Franklin Jefferson Wang
(74) *Attorney, Agent, or Firm* — Fishman Stewart PLLC

(57) ABSTRACT

An optical head for a laser transmission welding apparatus comprising a housing with an end on the outlet side with respect to a laser beam and a ball mounted in the housing. The ball may comprise a material whose refractive index is higher than the refractive index of quartz glass.

11 Claims, 3 Drawing Sheets

(51) Int. Cl.
    *B23K 26/14*     (2014.01)
    *B23K 26/21*     (2014.01)
    *B29C 65/00*     (2006.01)
    *B29C 65/16*     (2006.01)
    *B23K 103/00*     (2006.01)

(52) U.S. Cl.
    CPC .......... *B23K 26/21* (2015.10); *B29C 65/1638* (2013.01); *B29C 66/81267* (2013.01); *B23K 2103/42* (2018.08)

(56) References Cited

U.S. PATENT DOCUMENTS

| | | | | |
|---|---|---|---|---|
| 10,162,135 | B2 * | 12/2018 | Gamache | G02B 6/4214 |
| 2002/0093998 | A1 * | 7/2002 | Kimura | G02B 6/4215 |
| | | | | 372/36 |
| 2006/0289410 | A1 * | 12/2006 | Morita | B23K 26/0617 |
| | | | | 219/121.75 |
| 2012/0103955 | A1 * | 5/2012 | Hyun | B23K 26/082 |
| | | | | 219/121.83 |
| 2014/0127668 | A1 | 5/2014 | Kugelmann | |
| 2016/0202038 | A1 * | 7/2016 | Kim | H04N 7/18 |
| | | | | 348/135 |
| 2016/0368099 | A1 * | 12/2016 | Grapov | B23K 26/1476 |

FOREIGN PATENT DOCUMENTS

| | | | | |
|---|---|---|---|---|
| CN | 103313817 | A * | 9/2013 | ........... B23K 26/046 |
| DE | 4319742 | A1 | 12/1994 | |
| EP | 1508428 | A1 * | 2/2005 | ......... B29C 65/1635 |
| EP | 1405713 | B1 | 9/2005 | |
| JP | 2005081396 | A * | 3/2005 | ......... B29C 65/1635 |
| JP | 2005081396 | A | 3/2005 | |
| JP | 2010236870 | A * | 10/2010 | |
| WO | 2014072326 | A1 | 5/2014 | |

OTHER PUBLICATIONS

Anonymous. "Laser Transmission Welding of Polymers—Industrial Laser Solutions" Jan. 10, 2008, retrieved from the internet: https://www.industrial-lasers.com/articles/2008/10/laser-transmission-welding-of-polymers.html [retrieved on Sep. 6, 2018] XP055505212.
Chinese Office Aciton, 201880046966.5, dated Nov. 18, 2021 with translation.

* cited by examiner

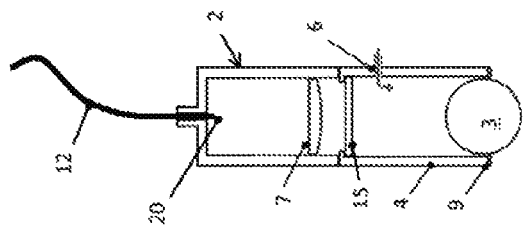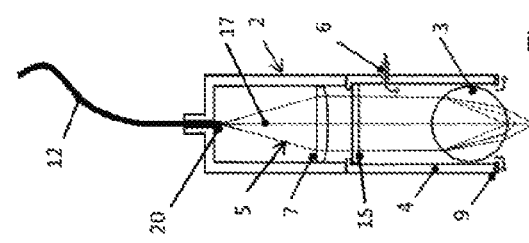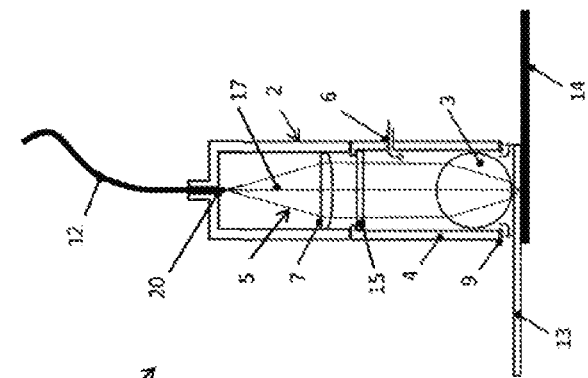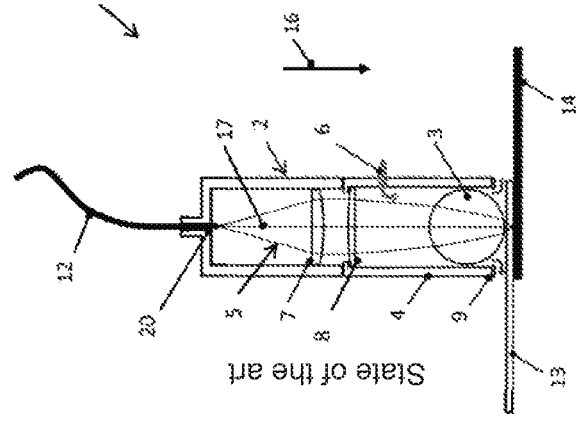

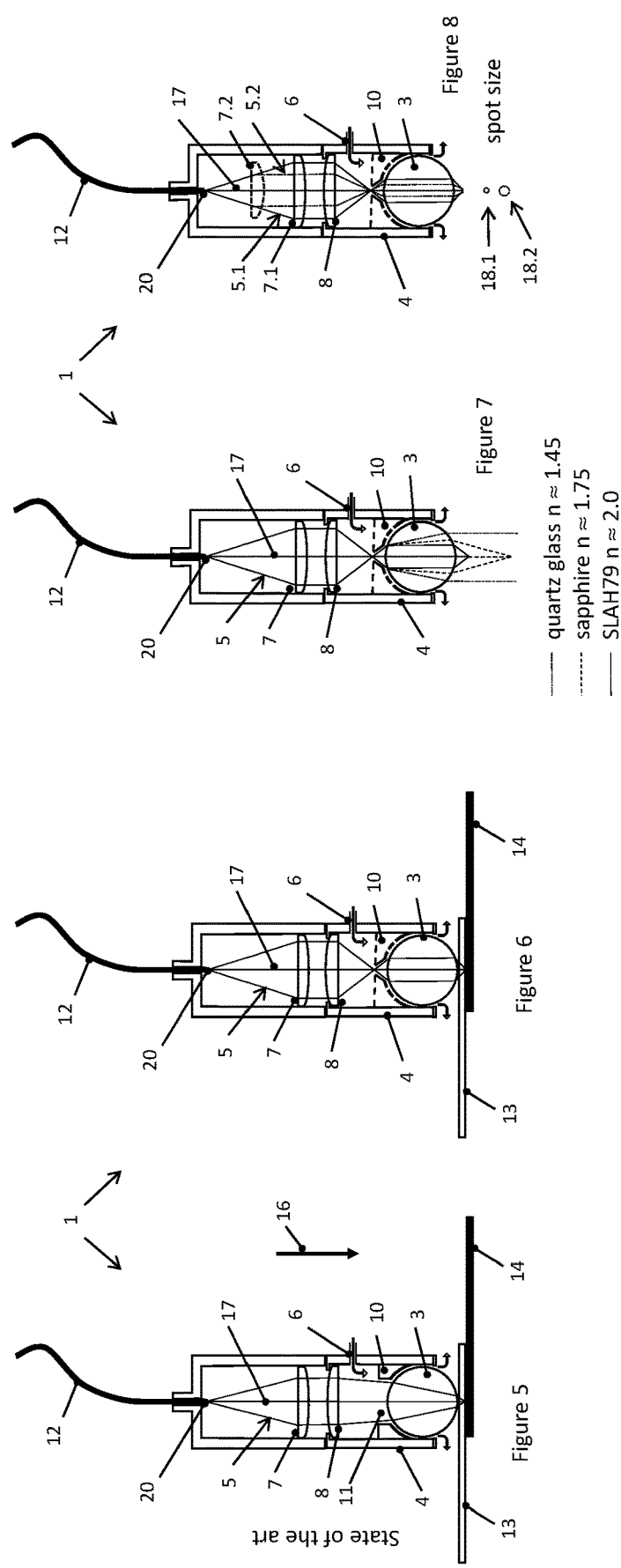

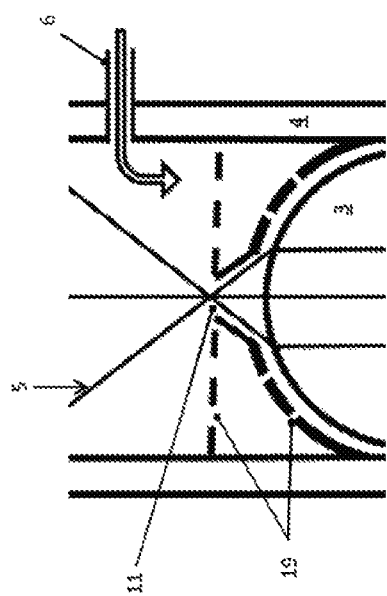

OPTICAL HEAD

CROSS-REFERENCE TO RELATED APPLICATIONS

This application is a national phase application of and claims priority to International Patent Application No. PCT/EP2018/069330, filed Jul. 17, 2018, which claims the benefit of German Patent Application No. 102017116110.4, filed Jul. 18, 2017, each of which is hereby incorporated herein by reference in its entirety.

TECHNICAL FIELD

The invention is directed to an optical head for a device for laser transmission welding and a method for welding two joining partners by laser transmission welding.

BACKGROUND

Methods for welding plastics using a laser are known from the state of the art. In a laser transmission welding process, one of the joining partners to be joined or welded is highly transparent to laser beams, while the other joining partner has a high degree of absorption with respect to laser beams. Thus, the laser beam passing through a joining partner provides local heating at a joint located between both components. The pressure required for welding is built up in a known manner by pressing both joining partners together.

Numerous variants of devices and processes for laser transmission welding are known.

For example, devices for laser transmission welding comprising an optical head are known. In particular, optical heads or processing heads are known which comprise a housing with a laser-transparent ball inside. Such optical heads are suitable, for example, for joining two plastic joining partners to be welded together by pressing the ball onto corresponding joining points and at the same time serving as a lens for a laser beam used for welding, which is directed through the ball onto the joining point. Preferably, the ball is movably mounted inside the housing, so that the optical head is easily guided along a weld seam to be generated or a path along which the weld seam is to be created. The ball rolls on a surface of one of the joining partners and continuously exerts the contact pressure required for welding.

Such devices comprising an optical head are disclosed in EP 1 405 713 B1, DE 43 19 742 A1 and WO 2014 072 326 A1. One of the advantages of the optical heads according to the above-mentioned documents is that the parts to be welded do not have to be pressed together simultaneously at all locations to be welded or along the entire weld seam. Instead, the ball only presses the parts to be welded together at the point and at the moment where the laser beam hits them.

EP 1 405 713 B1 discloses a mechanical mount in which the ball is supported, while the ball is guided or supported displaceably within the optical head according to WO 2014 072 326 A1, i.e. the ball can be displaced within the optical head in addition to the rolling movement. In this case it is a vertical displacement within the optical head perpendicular to the welding surface. The ball is pressed onto the joining partners during the welding process with compressed air. The optical head according to DE 43 19 742 A1 also works with compressed air.

The disadvantage of known optical heads with a mechanical mount, such as an air bearing for the ball, is that a maximum contact pressure, which is transferred from the optical head to the ball via the mount and thus to the joining partners to be welded, is limited by the design of the mechanical mount. For the same reason, it is not yet possible to use balls with a diameter of less than 30 mm in optical heads with mechanical mounts.

A disadvantage of known optical heads with a sliding ball is that the focus distance changes depending on the position of the ball in the optical head. If the ball of such an optical head is pressurized with compressed air in order to transmit the necessary pressure to the joining partners, it is usually not possible to transmit high forces. The force transmitted from the ball to the joining partners and the resulting pressure depend on numerous factors, including the diameter of the ball. In this context, high forces can be understood as forces of at least about 50 N.

A focus distance is the distance between the lens and the focus or focal point, even if the incoming radiation is not collimated. In contrast, the focal length is a characteristic value of a lens, which is limited to the case that the incoming beam or radiation is collimated radiation or a collimated beam.

A further disadvantage of known optical heads with a mechanical mount for the ball is that they often do not allow a predefined small force to be reliably applied to the joining partners. Limiting factors here are, for example, the weight of the optical head acting on the joining partners, as well as a normally available device for pressing on the optical head, for example a pneumatic slide, which usually has to be operated with at least 1 bar. Devices with optical heads with mechanical mounts are usually designed for high forces. However, if high forces are transmitted from the optical head to the joining partners, the ball can create a bead and push it in front of it, which can lead to distortion and wrinkling. In the case of known optical heads with sliding balls as described above, for example, the weight of the entire optical head does not act on the joining partners to be joined, but only the weight of the ball. However, known optical heads with sliding balls do not provide a solution to this problem, because changing the ball position in the shaft can significantly change the focus distance, which means that reliable welding is no longer guaranteed.

To counteract the wrinkling and distortion, a thick laser-transparent foil or a glass plate could also be considered, which is placed between the ball and the joining partners. However, this makes the welding process more complicated and inflexible.

SUMMARY

The purpose of the present invention is to overcome the disadvantages of the prior art.

The disclosure leads to the solution of the problem. Advantageous embodiments are also described.

An optical head for a device for laser transmission welding according to the present invention comprises a housing with an end on the outlet side with respect to a laser beam and a ball mounted in the housing. The ball is made of a material whose refractive index is higher than the refractive index of quartz glass. The refractive index of known quartz glass is about 1.45.

In the context of the present invention, a laser beam is preferably understood to be the radiation emitted by a laser source.

The ball is a laser transparent ball. Whenever the present invention refers to a ball, such a laser-transparent ball is always meant.

An optical fibre, for example a glass fibre or similar, may be provided opposite the outlet end to introduce the laser beam into the housing. This passes through the housing and the ball, which acts as a lens.

Such an optical head can be used in apparatuses for contour welding, for example. Contour welding is a variant of laser transmission welding in which the optical head is guided along the weld seam to be produced, whereby the laser beam passes each point on the weld seam only once. However, the present invention can also be applied to other variants of laser transmission welding.

The ball may be made of a material whose refractive index is at least 1,6. The ball may preferably be made of a material whose refractive index is at least 1,7. Furthermore, material with a refractive index of at least 1.75 may also be considered. For example, materials whose refractive index is between 1.76 and 2.15 may be considered.

Materials for the ball include sapphire, ruby, spinel, cubic zirconia, LAH79, N-SF8, N-LASF44, S-LAH53, LASF35, N-LaSF9, LaSFN9, SLAH58, SLAH65, SLAH71, SLAH79, STiH53, L-BBH1, K-VC89 or K-PsFn203.

The ball is preferably mounted rotatably within the housing, so that welding seams of any geometry can be produced.

The diameter of the ball may be less than or equal to 15 mm, preferably less than or equal to 10 mm.

It may be considered to fit a restraint on the housing to retain the ball. Preferably, this restraint is located at the outlet end of the housing.

On the one hand, the restraint serves to retain the ball so that it cannot fall out of the outlet end.

On the other hand, the retention device serves to seal the outlet end of the housing or the optical head. As explained in more detail below, compressed air is preferably introduced into the optical head. An appropriate air inlet can be provided for this purpose. This can provide the necessary contact pressure with which the ball is pressed onto the parts to be joined. It can also be used to provide an air bearing for the ball. The joining partners are usually plastic parts, for example films or similar.

The restraint described above is preferably only provided in embodiments of the optical head where the ball is mounted slidably within the housing or within the shaft section, as only these embodiments require sealing. Of course, an embodiment of the optical head described in more detail below, comprising an air bearing, also has at least one means of retaining the ball so that it cannot fall out of the air bearing on the outlet side. Such a device may be similar in design to the restraint described above.

The housing may include a cylindrical shaft section. In this shaft section the ball can be mounted slidably. For example, the ball can be mounted slidingly in longitudinal direction within the cylindrical shaft section. The optical head may include a collimating lens or collimator which is designed to substantially collimate the laser beam before it strikes the ball.

A collimating lens is usually a converging lens. In the context of the present invention, however, following a beam path within the optical head from the point of entry of the laser beam towards the ball is referred to as a converging lens only if the laser beam is focused towards the ball. If, on the other hand, for example, the laser beam, which emanates from a point-like point of entry into the housing, is collimated by a converging lens, so that the radiation heading for the ball is collimated, the term collimating lens is always used in this case.

In all embodiments of the present invention a compressed air inlet is preferably provided.

If the ball is slidably mounted in the shaft section, compressed air, which is fed into the interior of the optical head via the compressed air inlet, serves to apply a force to the ball in the direction of the outlet end. During the welding process, the ball is preferably pressed onto the parts to be welded by the compressed air alone.

Preferably, the collimating lens is arranged in the optical head in such a way that the laser beam is collimated or at least substantially collimated immediately before hitting the ball. When a collimated beam hits the ball, the focus distance does not change depending on a position of the ball in the shaft. On the other hand, if the beam were divergent or convergent immediately before hitting the ball, the focus distance would change depending on the position of the ball in the shaft.

Collimation, which takes place immediately before hitting the ball, means that the laser beam is no longer converted into a diverging or converging beam after collimation and before hitting the ball. Between the collimating lens and the ball in such embodiment there are therefore preferably no other optical devices which influence the beam, in particular no lenses which produce a convergent or divergent beam.

Compared to known optical heads where the ball is guided in a sliding manner, the combination of a beam collimated immediately before it strikes the ball and a ball with a high refractive index means that changing the position of the ball within the shaft has less effect on the focal distance and that the focal point is as close as possible to the ball. A high refractive index is preferably understood here to be one higher than that of quartz glass, for example higher than 1.45 or even higher than 1.7. Such an embodiment is particularly appropriate when the ball is subjected to a force of less than 150 N, for example less than 120 N, or less than 100 N, or less than 80 N, or even less than 50 N, via compressed air.

The optical head can be set up so that a spot size is determined by an installation height and/or a properties and condition of the collimating lens. This applies to all embodiments of the optical head according to the invention.

A spot size is defined as the diameter of the laser beam at the joint. The further away the joint is from the focus or focal point of the ball, the larger the spot size.

According to an alternative embodiment, an air bearing for supporting the ball can be added to the housing, which includes an opening for the laser beam to pass through. It may also be considered to place a converging lens in the optical head, which is designed and/or located in the housing in such a way that the laser beam is focused on the ball before it arrives. This focusing is preferably done in the area of the opening, i.e. within the opening or immediately before or after the opening, so that the opening can be kept as small as possible.

The opening may have a maximum diameter of 4 mm. Preferably, the diameter of the opening measures a maximum of 2 mm.

Preferably, the air bearing has at least one recess for the passage of compressed air in addition to the opening.

The present invention also comprises a process for welding two joining partners by laser transmission welding by means of an optical head comprising a ball as described above.

The spot size of the laser beam can be selected for all versions of the present invention by the installation height and/or the properties and conditions of the collimating lens.

The laser beam can be collimated immediately before hitting the ball. This means that the focus distance of the laser beam leaving the ball on the outlet side is not dependent on the position of the ball within the shaft. In other words, in the case of a laser beam collimated before it hits the ball, an angle of incidence of the laser beam is always the same regardless of the position of the ball, and the same applies to the angle of exit of the laser beam.

Alternatively, the laser beam can be focused on the ball before it arrives. This is particularly useful if the ball is mounted in an air bearing with an opening for the laser beam to pass through. It is advantageous to make the opening as small as possible so that the air bearing can transmit large forces to the ball. Here the laser beam is preferably focused in the area of the opening.

BRIEF DESCRIPTION OF THE DRAWINGS

Further advantages, features and details of the invention can be found in the following description of preferred embodiments as well as in the drawings; these are shown in:

FIG. 1 a known optical head 1, in which the ball 3 is slidably guided,

FIG. 2 an optical head 1 according to a first embodiment of the present invention, FIG. 3 different courses of the laser beam 5 in the optical head according to FIG. 2 for balls 3 with different refractive index, FIG. 4 the optical head 1 according to FIG. 2 in non-operating position, FIG. 5 shows a known optical head 1, in which the ball is supported in an air bearing 10, FIG. 6 an optical head 1 according to a second embodiment of the present invention, FIG. 7 different courses of the laser beam 5 in the optical head according to FIG. 6 for balls 3 with different refractive index, FIG. 8 different courses of the laser beam 5 in the optical head according to FIG. 6 for different collimating lenses 7, as well as in FIG. 9 an enlarged section of FIG. 6.

DETAILED DESCRIPTION

FIG. 1 shows an optical head 1 according to the state of the art. A ball 3 is located in an end of a housing 2 on the outlet side with respect to a laser beam 5 or beam path 5. A cylindrical shaft section 4, a restraint 9 at the exit side, a compressed air inlet 6, an optical fiber 12, a collimating lens 7 and a converging lens 8 are also shown. In addition, the joining partners 13, 14 to be welded are shown.

FIG. 2 shows an optical head 1 according to a first embodiment of the present invention. This differs from the known optical head 1 according to FIG. 1 on the one hand with regard to the converging lens 8, which has been replaced by a sealing plate 15, and on the other hand with regard to the refractive index of the material of which the ball 3 is made.

FIG. 3 shows different courses of the laser beam 5 in the optical head 1 according to FIG. 2 for balls 3 with different refractive index.

FIG. 4 shows the optical head 1 according to FIGS. 2 and 3 in a non-operating position.

FIG. 5 shows another optical head 1 according to the state of the art. In addition to some features already described in relation to FIG. 1, this optical head 1 includes an air bearing 10.

FIG. 6 shows an optical head 1 according to a second example of the present invention. This differs from the known optical head 1 according to FIG. 5 on the one hand with regard to the composition of the converging lens 8 and on the other hand with regard to the refractive index of the material of which the ball 3 is made. In addition, FIG. 6 shows that the air bearing 10 has further recesses 19 for the passage of compressed air in addition to the central opening 11. The opening 11 and the recesses 19 are not further described in FIGS. 6 to 8, but are clearly shown in FIG. 9.

FIG. 7 shows different courses of the laser beam 5 in the optical head 1 according to FIG. 6 for balls 3 with different refractive index.

FIG. 8 shows different courses of the laser beam 5 in the optical head 1 according to FIG. 6 for different collimating lenses 7.1, 7.2.

FIG. 9 shows an enlarged section of FIG. 6 around the central opening 11.

With reference to FIGS. 1 to 9, the function of the optical head 1 according to the invention is explained as follows:

The known optical head 1 shown in FIG. 1 is located above a welding point or a joining point where the joining partners 13, 14 are to be joined together by welding. The optical head 1 is guided at a small distance above the laser transparent joining partner 13. The ball 3 is pressurized with compressed air, which is fed into the interior of housing 2 via the compressed air inlet 6. Thus, a force acting in the direction of an arrow 16 is applied to the ball 3 and presses the joining partners 13, 14 together. A contact pressure, which is transmitted from ball 3 to the joining partners 13, 14, can be adjusted by a supply of compressed air. A part of the compressed air which is fed into the housing escapes at the outlet end, which is indicated there by unspecified arrows. The laser beam 5 emerging from the optical fiber 12 is first collimated by the collimating lens 7 and then focused by the converging lens 8 and the ball 3, which also acts as a converging lens. The focus of the laser beam 5 is then located in a joint located between the two joining partners 13, 14, where both joining partners 13, 14 are welded.

The ball 3 is slidably guided in the shaft 4, i.e. it can move in the direction of the arrow 16 or in the opposite direction within the shaft section 4. As the laser beam 5 converges between the converging lens 8 and the ball 3, which can be clearly seen in FIG. 1, an angle of incidence of the laser beam 5 into the ball 3 changes depending on the position of the ball 3 within the shaft section 4.

The converging lens 8 seals the cylindrical shaft section 4 at the top so that the incoming compressed air is directed towards the ball 3, see the unspecified arrow inside the compressed air inlet 6 in FIG. 9.

If the optical head 1 or the housing 2 is moved at a constant height over the parts to be welded 13, 14 and passes a section where at least one of the parts to be welded 13, 14 is particularly thick or thin, the ball 3 is moved a little in the direction of arrow 16 or against the direction of arrow 16. Although a distance that the ball 3 travels along or against the direction of arrow 16 is often only a fraction of its diameter, it can already lead to a significant change in focus for the reasons described below.

In a known optical head 1 according to FIG. 1, the focal point is shifted on the one hand by changing an entrance angle in or against the direction of the arrow 16, provided that the positions of the joining partners 13, 14 and the housing 2 remain unchanged. This follows from the known laws of optics, according to which the laser beam 5 is refracted towards the perpendicular when it passes into the ball 3, i.e. into the optically denser medium.

If the positions of the joining partners 13, 14 and the housing 2 are maintained, the position of the focal point changes on the other hand due to the changed position of the ball 3 within the shaft section 4, because an exit point at which the laser beam 5 leaves the ball 3 has been displaced along or against the direction of the arrow 16. Depending on the design of the optical head 1, both effects often have the same impact, i.e. when the ball 3 is moved in the direction of arrow 16, the two effects mentioned above often add up and influence the position of the focal point. Therefore, for a known optical head 1 according to FIG. 1, even slight changes in the position of the ball 3 within the housing 2 or within the shaft section 4 result in a significant change of the focal point in or against the direction of arrow 16.

In the optical head 1 according to a first embodiment of the present invention depicted in FIG. 2, the collimated laser beam 5 after the collimating lens 7 runs parallel to the optical axis 17 of the ball 3 acting as lens. The first effect described above concerning different angles of incidence depending on the position of the ball 3 along the direction of arrow 16 therefore does not occur.

FIG. 3 shows that by choosing a material with a high refractive index n the focusing capabilities can be significantly improved. The higher the refractive index n of the material of which ball 3 is made, the higher, i.e. the closer to ball 3, the focal point or focus is located.

FIGS. 1 to 3 each show an optical head 1 in the operating position, whereas in FIG. 3 the joining partners 13, 14 are not shown for a better overview. FIG. 4, on the other hand, shows the optical head 1 according to FIGS. 2 and 3 in non-operating position.

FIG. 4 shows that the ball 3 moves in the direction of the arrow 16 in the non-operating position and seals the outlet end of the housing 2 together with the restraint 9. This can also be seen by comparing the unspecified arrows near the compressed air inlet 6 and the outlet end in FIGS. 1 to 4. In the non-operating position according to FIG. 4, no air escapes at the outlet end. In contrast, in the operating position shown in FIGS. 2 and 3, a certain amount of compressed air always forces its way between the inside of the shaft section 4 and the surface of the ball 3 and leaves the housing 2 at the outlet end. The restraint 9 preferably ensures on the one hand that the ball 3 cannot fall out of the housing 2. On the other hand, in the non-operating position it seals the outlet end together with ball 3.

The sealing plate 15, just like the converging lens 8 of the known optical head according to FIG. 1, ensures that the compressed air is directed towards the ball 3.

FIGS. 6 to 8 show a second embodiment of the present invention with an improved optical head 1 compared to the state of the art as shown in FIG. 5.

The function of the optical head 1 according to FIG. 5 is largely analogous to the function of the optical heads 1 described above according to FIGS. 1 to 4, except that the ball 3 is not displaceably guided along the shaft section 4 but is supported in an air bearing 10. The pressure exerted on the joining partners 13, 14 is therefore not the result of the force caused by compressed air acting on the ball 3 along arrow 16, as is the case with the optical heads 1 according to FIGS. 1 to 4. Instead, this pressure on the optical heads 1 according to FIGS. 5 to 8 results from the force with which the entire optical head 1 is pressed onto the joining partners 13, 14. Indeed in the optical heads 1 as shown in FIGS. 5 to 8 compressed air is also introduced into the interior of housing 2 via a corresponding compressed air inlet 6. However, this compressed air is only used to provide the functional air bearing 10, which ensures that ball 3 can rotate freely.

The known optical head 1 according to FIG. 5 is preferred to the optical head according to FIG. 1, if, for example, high forces are to be transmitted via the ball 3 to the joining partners 13, 14. In the case of an embodiment according to FIG. 1, the required air pressure, which must be built up via the compressed air inlet 6 in housing 2, is often too high. In addition, the air flow is often too high, i.e. so much air escapes on the outlet side that ball 3 cannot be pressurized with the required pressure.

In the optical head 1 according to the second embodiment of the present invention, which is shown in FIG. 6, the converging lens 8 is designed and/or arranged in the housing 2 in such a way that the laser beam 5 is focused on the ball 3 before it arrives. This could be referred to as an intermediate focusing or intermediate focusing, which takes place before focusing the laser beam 5, which is necessary for welding, after its exit from the ball 3 at the joint between the joining partners 13, 14.

As can be clearly seen from a comparison of FIGS. 5 and 6, the focal point of the converging lens 8, located between the converging lens 8 and the ball 3, allows the minimization of a diameter of the opening 11 of the air bearing 10. It should be noted that for the sake of clarity the reference number 11 is only shown in FIGS. 5 and 9, but not in FIGS. 6 to 8.

FIG. 7 clearly shows that by using a material with a high refractive index n of, for example, 1.75 or 2.0, the focal point of the laser beam leaving ball 3 is much closer to ball 3 than when using materials with a low refractive index n such as 1.45.

The air bearing 10 shown in FIGS. 6 to 8 covers a much larger section of the ball 3 compared to the air bearing 10 shown in FIG. 5. In particular, the opening 11 (not provided with reference numbers in FIGS. 6 to 8) is essentially limited to a section around the optical axis 17. The air bearing 10 as shown in FIGS. 6 to 8 enables a significantly better transmission of a force acting on the housing 2 to the joining partners 13, 14, since the air bearing 10 also encompasses an area of the ball 3 that is essentially opposite the welding point. Force transmission in the direction of arrow 16 is all the more effective the closer the point of application of the force to be transmitted comes to an area which is essentially opposite the welding point.

A comparison of FIGS. 5 to 7 shows that the present invention is based, inter alia, on the finding that the opening 11 of known optical heads 1 with a ball 3 of quartz glass has such a large diameter because a laser beam 5, which converges to a greater extent than the laser beam 5 according to FIG. 5, would, after passing through the ball 3, have a focal point very far from the ball 3 if the converging lens 8 causes an intermediate focus in front of the ball 3. The reason for this is that the ball 3 of known optical heads 1 is usually made of a material whose refractive index n is below 1.75, usually even significantly below 1.7. On the other hand, if a material with a high refractive index n, for example 1.8 or even 2.0, is used, the opening 11 can be reduced and the laser beam 5 can be focused in the area of aperture 11, as shown in FIGS. 6 to 8.

For a known optical head 1 as shown in FIG. 5, the air bearing 10 limits the maximum force to be transmitted. On the one hand, the known air bearing 10 as shown in FIG. 5 does not allow forces exceeding 150 N to be transmitted to the joining partners. On the other hand, it has not yet been possible to use balls 3 with a small diameter of less than 30 mm, for example, because the air bearings 10 used with such small balls 3 already reached their limit when transmitting forces below 150 N. The embodiments shown in FIGS. 6 to 8 allow forces of more than 150 N to be transmitted and significantly smaller balls 3 to be used, for example those with a diameter of less than 15 mm.

FIG. 8 shows how the arrangement of differently designed collimating lenses 7.1, 7.2 with different mounting heights affects the focal point. The focal length of the collimating lens 7.1 is longer than the focal length of the collimating lens 7.2. Accordingly, when the collimating lens 7.1 is mounted in the housing 2 as in FIG. 8, it produces a beam 5.1 with a wider diameter. This in turn leads to a small spot size 18.1 in the focal point.

The spot sizes 18.1, 18.2 for the beam paths 5.1, 5.2 are indicated in FIG. 8 for the case that the joining partners 13, 14 are arranged as shown in FIG. 6.

Compared to collimating lens 7.1, another collimating lens 7.2 is shown in dashed lines in FIG. 8. This leads to a laser beam 5.2 with a smaller diameter, also shown as dashed lines. The spot size 18.2 of this laser beam 5.2 in the focal point is larger than the spot size 18.1 of the laser beam 5.1.

Although only one or a few preferred embodiments of the invention have been described and presented, it is obvious that the person skilled in the art can add numerous modifications without leaving the essence and scope of the invention.

For example, the shaft section 4 in the embodiments according to FIGS. 6 to 8 does not have to be cylindrical because, in contrast to the embodiment according to FIGS. 2 to 4, ball 3 is not displaceably mounted in shaft section 4.

The different beam diameters shown in FIG. 8 could also be achieved in other ways than by using different collimating lenses 7.1, 7.2 with different mounting heights. Of course, it could also be sufficient to provide a collimating lens 7 with different characteristics but the same installation height to change the beam diameter.

Alternatively, it may be considered to change the installation height of the collimating lens 7 only. However, it must be noted that due to the constant focal length of the collimating lens 7, the radiation leaving the collimating lens 7 in direction to the ball 3 is no longer completely collimated. This is only the case if, as shown in FIGS. 1 to 3 and 5 to 8, the focal point of the collimating lens 7 coincides with an entry point 20 of the radiation from optical fibre 12.

It might also be considered to change the height of the collimating lens 7 during operation of optical head 1 or during breaks in operation. For this purpose, the housing 2 and the collimating lens 7 would have to be equipped with appropriate devices for changing the height. As mentioned above, the laser beam 5 arriving on ball 3 (FIGS. 2 and 3) or on the converging lens 8 (FIGS. 6 to 8) would no longer be completely collimated, but would diverge or converge to a certain extent. However, such an embodiment could allow some fine tuning as long as the divergence or convergence of the laser beam 5 remains within manageable limits.

With regard to FIGS. 6 to 8, it could also be considered to replace the combination of collimating lens 7 and converging lens 8 by a single sufficiently strong focusing lens, which also provides intermediate focusing in the area of aperture 11. It should be noted, however, that collimated section of the laser beam 5 allows, for example, a length of the housing 2 to be adjusted and, if necessary, further optical elements that do not change the collimation to be inserted into the beam path without the need for additional lenses or the like.

Restraint 9 shown in FIGS. 2 to 4 may be a chamfer.

The recesses 19 of the air bearing 10 shown in FIGS. 6 to 9 are advantageous but not essential. According to a simple embodiment, these recesses 19 can also be dispensed with.

The air bearing 10 can of course be designed differently. For example, it could be a differently shaped concave or at least partially concave undercut, which is complementary or at least partially complementary to ball 3.

The invention claimed is:

1. An optical head for a device for laser transmission welding, the optical head comprising:
   a housing with an end on an outlet side with respect to a laser beam;
   a ball mounted in the housing, wherein the ball is made of a material whose refractive index is at least 1.45;
   an air bearing for mounting the ball associated with the housing, the air bearing comprising an opening for the passage of the laser beam, wherein the opening measures a maximum of 4 mm in diameter; and
   a converging lens designed and/or arranged within the housing such that a focal point of the laser beam is located between the converging lens and the ball,
   wherein the converging lens is arranged in the optical head such that there are no optical elements positioned along an optical axis of the laser beam between the converging lens and the ball.

2. The optical head according to claim 1, wherein the refractive index is at least 1.7.

3. The optical head according to claim 1, wherein the diameter of the ball is less than or equal to 15 mm.

4. The optical head according to claim 3, wherein the diameter of the ball is less than or equal to 10 mm.

5. The optical head according to claim 1, including a restraint arranged on the housing for retaining the ball.

6. The optical head according to claim 1, wherein a spot size of the laser beam is determined by an installation height and/or properties and conditions of a collimating lens.

7. The optical head according to claim 1, wherein the air bearing further comprises at least one recess for the passage of compressed air.

8. A method for welding two joining partners, the method comprising:
   laser transmission welding the two joining partners by means of the optical head of claim 1.

9. The method according to claim 8, wherein a spot size of the laser beam is selected according to or based on an installation height and/or properties and conditions of a collimating lens.

10. The method according to claim 8, wherein the laser beam is focused before it strikes the ball.

11. The optical head according to claim 1, wherein the opening measures a maximum of 2 mm in diameter.

* * * * *